(12) United States Patent
Mossoba et al.

(10) Patent No.: US 12,212,676 B2
(45) Date of Patent: Jan. 28, 2025

(54) SYSTEMS AND METHODS FOR SHARING VALIDATED USER ACTIVITY

(71) Applicant: Capital One Services, LLC, McLean, VA (US)

(72) Inventors: Michael Mossoba, Great Falls, VA (US); Tyler Maiman, Melville, NY (US); Joshua Edwards, Philadelphia, PA (US)

(73) Assignee: Capital One Services, LLC, McLean, VA (US)

( * ) Notice: Subject to any disclaimer, the term of this patent is extended or adjusted under 35 U.S.C. 154(b) by 217 days.

(21) Appl. No.: 18/145,070

(22) Filed: Dec. 22, 2022

(65) Prior Publication Data

US 2024/0214204 A1 Jun. 27, 2024

(51) Int. Cl.
*H04L 9/32* (2006.01)

(52) U.S. Cl.
CPC .......... *H04L 9/3213* (2013.01); *H04L 9/3247* (2013.01)

(58) Field of Classification Search
CPC ............................ H04L 9/3213; H04L 9/3247
USPC ......................................................... 713/159
See application file for complete search history.

(56) References Cited

U.S. PATENT DOCUMENTS

| | | | |
|---|---|---|---|
| 11,398,911 B1* | 7/2022 | Gunning | G07F 17/0014 |
| 2022/0270084 A1* | 8/2022 | Xue | H04L 9/088 |
| 2023/0011621 A1* | 1/2023 | Jakobsson | H04L 9/3213 |
| 2023/0075884 A1* | 3/2023 | Jakobsson | H04L 9/50 |
| 2023/0122552 A1* | 4/2023 | Meyers | H04L 9/3228 |
| | | | 463/29 |

* cited by examiner

*Primary Examiner* — Liang Che A Wang
(74) *Attorney, Agent, or Firm* — Foley & Lardner LLP

(57) ABSTRACT

Methods and systems are described herein for novel uses and/or improvements to sharing cryptographic tokens based on user's real-world actions through social media so those real-world actions may be confirmed as authentic (e.g., verified and/or validated). More specifically, methods and systems disclosed herein enable sharing validated user activity by generating and using cryptographic tokens. The system may ensure that the cryptographic tokens verify the user's activity. The system may extract token data of a cryptographic token to post to a social media platform for activity verification. Thus, by using cryptographic tokens of the user's activity data, the system is able to verify the user's activity.

20 Claims, 7 Drawing Sheets

300

| User ID | Cryptography-based Storage Application ID | Device ID |
|---|---|---|
| <Identification Data> | <Identification Data> | <Identification Data> |

302 — User ID
304 — Cryptography-based Storage Application ID
306 — Device ID

FIG. 3

SYSTEMS AND METHODS FOR SHARING VALIDATED USER ACTIVITY

BACKGROUND

In recent years, the use of blockchain technology for various applications has exponentially increased. Blockchain technology enables immutable recording of information, resulting in a paradigm where the recorded information is open and traceable. In addition, blockchain technology enables that information to be duplicated and distributed across an entire network of computer systems hosting the blockchain, which may span countries and continents. Thus, a blockchain is also a decentralized source of information that does not require a central authority to monitor operations, maintain records, and/or enforce rules. On way to use blockchain technology is for verifying information and validating claims, for example, information and claims posted on social media. Many people like to share their daily lives on social media so that their followers and other users are able to stay up to date on their lives. For example, people share photos and videos of trips they take and positive experiences they have such as important purchases. However, other users are unable to verify that the information is authentic and that those claims are true (e.g., people are unable to verify that a person dined in a particular restaurant in the person's post).

SUMMARY

However, by using blockchain technology, users are able to share verified activities that are typically difficult to verify. Accordingly, a mechanism is disclosed that would allow sharing user activity that can be verified and validated. One mechanism to allow users to securely share and validate information may use cryptographic tokens (e.g., non-fungible tokens, also known as NFTs). Methods and systems are described herein for novel uses and/or improvements to sharing cryptographic tokens based on user's real-world actions through social media so those real-world actions may be confirmed as authentic (e.g., verified and/or validated). Currently, social media platforms do not provide a way to post activities that are verified and/or validated. For example, existing systems allow users to share user activities without verifying the activities. A user may share an image of an activity, but there is no way to verify that the activity is authentic as images may be manipulated. To overcome this and other problems, methods and systems disclosed herein enable sharing validated user activity by generating and using cryptographic tokens. The system may ensure that the cryptographic tokens verify the user's activity. The system may extract token data of a cryptographic token to post to a social media platform for activity verification. Thus, by using cryptographic tokens to represent a user's activity data, the system is able to verify the user's activity.

In some aspects, the problems described above may be solved using an activity verification system which may perform the following operations. The activity verification system may receive a user request to share a user's an activity. In particular, the activity verification system may receive a first request to share activity data associated with a user to a social media platform. The first request may include a token identifier associated with a non-fungible token. The non-fungible token may have been generated based on the activity data associated with the user. For example, the user may have travelled to a particular location and had a meal in a particular restaurant. The user may want to share that experience (e.g., via photo). As a result, the activity verification system may receive a post request indicating that the user is attempting to share the activity. The system may receive the post and determine that the user's experience was genuine.

The activity verification system may identify a user device that stores a cryptography-based storage application (e.g., a cryptographic wallet application) that controls the non-fungible token. In particular, the activity verification system may determine, based on the token identifier, a user device hosting a cryptography-based storage application that controls the non-fungible token. As a result, the activity verification system is able to send a request to a user device to generate a cryptographic signature. For example, when the activity verification system receives a request to share activity data, the activity verification system may use a token identifier to determine a user device (e.g., a smartphone) that hosts a digital wallet that is able to control the non-fungible token.

The activity verification system may request that the user device generate a cryptographic signature for confirming control of the associated cryptography-based storage application. In particular, the activity verification system may transmit to the user device hosting the cryptography-based storage application, a second request to generate a cryptographic signature using a private key associated with the cryptography-based storage application. As a result, the system is able to verify that the user device is able to control the non-fungible token. For example, the activity verification system may transmit to the user device (e.g., a smartphone) a request to generate a cryptographic signature using a private key stored on the smartphone within the cryptography-based storage application.

The activity verification system may then receive the cryptographic signature. In particular, the activity verification system may, in response to the second request, receive the cryptographic signature. As a result, the activity verification system is enabled to add verification to the post using the non-fungible token. For example, after transmitting a request for a cryptographic signature, a user may generate the cryptographic signature and the activity validation system may receive it.

The activity verification system may cause the post and an identifier of the non-fungible token to be posted on the social media platform. Based on the identifier of the non-fungible token and a corresponding cryptographic signature, a user who sees the post will be able to verify that the post describes a genuine activity. In particular, the activity verification system may transmit a post request to the social media platform. The post request may include the cryptographic signature and the token identifier of the non-fungible token. For example, the activity verification system may transmit a post indicating the activity and the post may include the cryptographic signature and the token identifier of the non-fungible token.

In some embodiments, the activity verification system may register a user by generating a user account. In particular, the activity verification system may receive, from the user device, a registration request to register a user account for storing token identifiers of non-fungible tokens associated with the user. The activity verification system may in response to the registration request generate the user identifier for the user account, and the system may store, within the user account, the user identifier, device information corresponding to the user device and the address associated with the cryptography-based storage application. As a result, when the system receives the registration request, an identifier of the cryptography-based storage application can be stored. For example, the activity verification system may receive from the user device (e.g., a smartphone) a request to register a new account. The activity verification system may store the user identifier, information about the user device, and the blockchain network address associated with the digital wallet.

In some embodiments, the activity verification system may receive a request to validate the non-fungible token. In particular, the activity verification system may receive from the device associated with the social media platform, a validation request. The validation request may include the cryptographic signature and the identifier of the non-fungible token. The activity verification system may determine based on the identifier of the non-fungible token, the address of the cryptography-based storage application, and the system may validate the cryptographic signature using the address associated with the cryptography-based storage application. As a result, the system may validate the non-fungible token that was posted on a social media platform. For example, a user may have had a meal at a popular restaurant and may want to post the activity on social media. To prove that the activity genuine and that the user actually went to the restaurant, the restaurant may generate an NFT in view of the user's visit and mint the NFT to a blockchain. The NFT may be assigned to be controlled by the user's cryptography-based storage application. The user may then use the NFT (as described above) to prove that the user has been to the restaurant.

Various other aspects, features, and advantages of the invention will be apparent through the detailed description of the invention and the drawings attached hereto. It is also to be understood that both the foregoing general description and the following detailed description are examples and are not restrictive of the scope of the invention. As used in the specification and in the claims, the singular forms of "a," "an," and "the" include plural referents unless the context clearly dictates otherwise. In addition, as used in the specification and the claims, the term "or" means "and/or" unless the context clearly dictates otherwise. Additionally, as used in the specification, "a portion" refers to a part of, or the entirety of (i.e., the entire portion), a given item (e.g., data) unless the context clearly dictates otherwise.

BRIEF DESCRIPTION OF THE DRAWINGS

FIG. 3 illustrates a data structure of a registration request, in accordance with one or more embodiments.

DETAILED DESCRIPTION

In the following description, for the purposes of explanation, numerous specific details are set forth in order to provide a thorough understanding of the disclosed embodiments. It will be appreciated, however, by those having skill in the art, that the embodiments may be practiced without these specific details, or with an equivalent arrangement. In other cases, well-known models and devices are shown in block diagram form in order to avoid unnecessarily obscuring the disclosed embodiments. It should also be noted that the methods and systems disclosed herein are also suitable for applications unrelated to source code programming.

Figure 1:
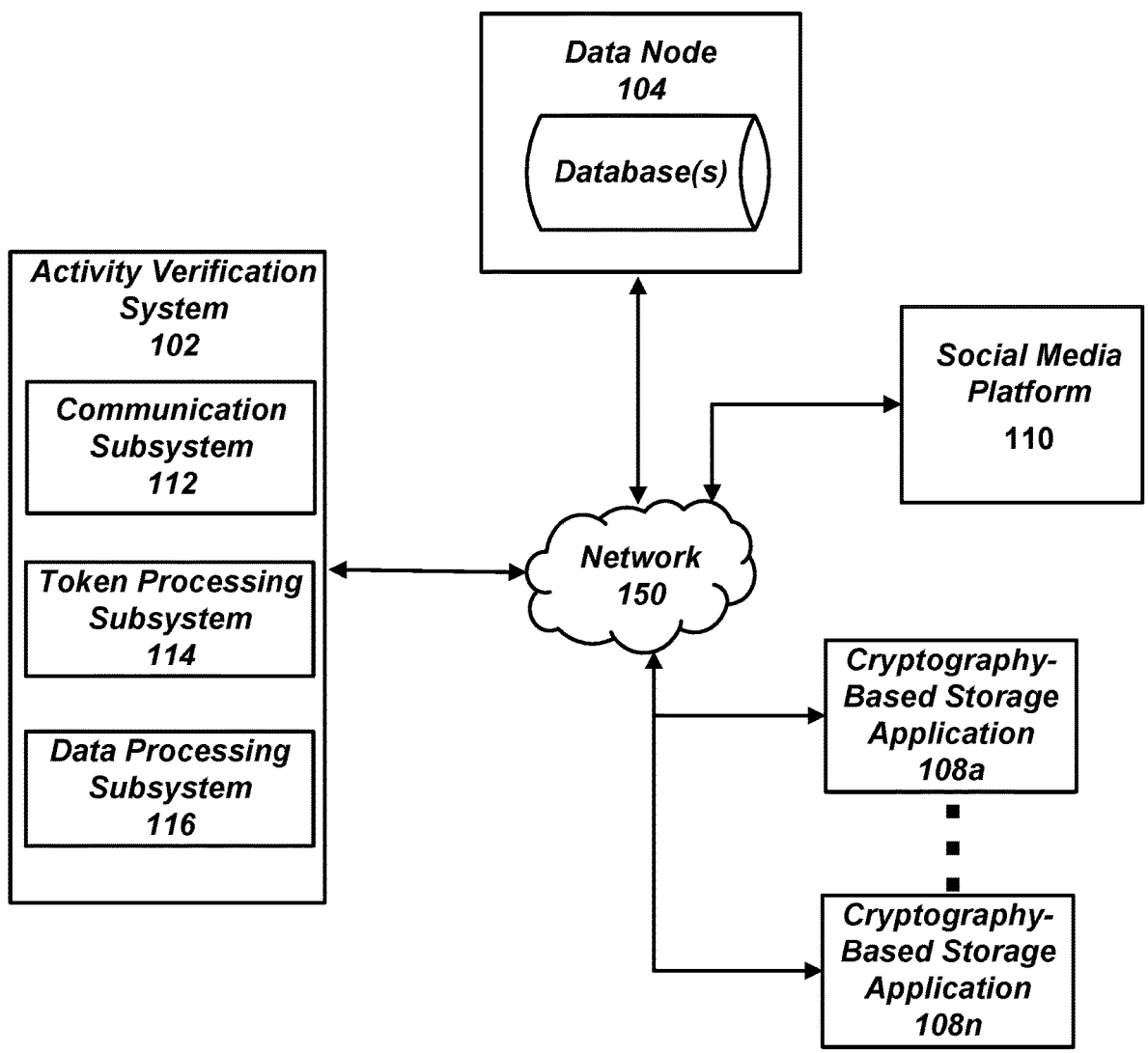
FIG. 1 shows an illustrative diagram for sharing validated user activity, in accordance with one or more embodiments.

FIG. 1 is an example of environment 100 for sharing validated user activity. Environment 100 includes activity verification system 102, data node 104, cryptography-based storage applications 108a-108n, and social media platform 110. Activity verification system 102 may execute instructions for sharing validated user activity. Activity verification system 102 may include software, hardware, or a combination of the two. For example, activity verification system 102 may be hosted on a physical server or a virtual server that is running on a physical computer system. In some embodiments, activity verification system 102 may be configured on a user device (e.g., a laptop computer, a smart phone, a desktop computer, an electronic tablet, or another suitable user device). Additionally, activity verification system 102 may be stored on a blockchain and may execute operations on a blockchain node. Cryptography-based storage applications 108a-108n may be referred to as crypto wallets (e.g., digital wallets) that may store associated private keys. In some embodiments, the operations the node may execute may be part of one or more on-chain programs sometimes referred to as smart contracts. Each cryptography-based storage application may store one or more keys (e.g., private keys) that enables the corresponding cryptography-based storage application to sign blockchain operations requests, thereby proving ownership/control of a particular cryptographic token (e.g., a non-fungible token) on a computer or another suitable user device (e.g., a smartphone, electronic tablet, etc.). A cryptographic token may be a token storing digital information (e.g., drawings, etc.) or value (e.g., monetary value), such as fungible or non-fungible token. A cryptographic token may be written to a blockchain (e.g., minted on a blockchain) via a blockchain operation performed by a blockchain node.

Data node 104 may store various data, including user data, copies of on-chain programs, and/or other suitable data. Data node 104 may include software, hardware, or a combination of the two. For example, data node 104 may be a physical server, or a virtual server that is running on a physical computer system. In some embodiments, activity verification system 102 and data node 104 may reside on the same hardware and/or the same virtual server/computing device. Network 150 may be a local area network, a wide area network (e.g., the Internet), or a combination of the two.

Cryptography-based storage applications 108a-108n may include software, hardware, or a combination of the two. For example, each cryptography-based storage application may include software executed on one or multiple devices or may include hardware such as a physical device. In some cases, the cryptography-based storage application may be software and may be stored in data nodes and a user of the cryptography-based storage application may access the cryptography-based storage application online, e.g., via a browser. Alternatively or additionally, the cryptography-based storage application may reside on a general-purpose computer or on a special device (e.g., a fob) intended for storing the cryptography-based storage application. For example, the device may store private keys in a memory of the device and allow transactions to be completed on the device itself.

Examples of cryptography-based storage applications may include cryptographic wallets. Devices may include any suitable end-user computing devices (e.g., desktop computers, laptops, electronic tablets, smart phones, and/or other computing devices used by end users) capable of transmitting and receiving data such as requests and/or like transactions.

Activity verification system 102 may receive requests for sharing activity data. In particular, activity verification system 102 may receive a first request to share activity data associated with a user to a social media platform. The first request may include a token identifier associated with a non-fungible token. The non-fungible token was generated based on the activity data associated with the user. For example, the user may want to share a generated non-fungible token of an image of a particular restaurant they went to. The activity verification system 102 will receive this request and verify the activity occurred. Components of the request to share validated user activity data for are described further herein with reference to FIG. 2.

Figure 2:
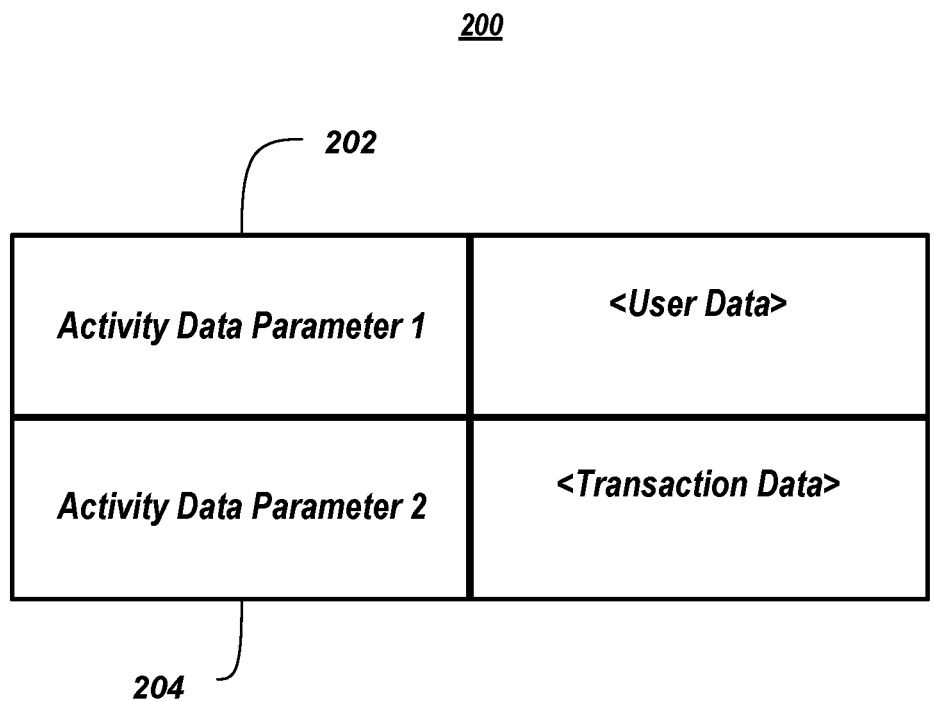
FIG. 2 illustrates a data structure of activity data for sharing validated user activity, in accordance with one or more embodiments.

FIG. 2 illustrates a data structure 200 of exemplary activity data for sharing validated user activity. Data structure 200 may include user identifier 202 and activity data 204. For example, user identifier 202 may include an identifier for a user account stored on the data node 104. Activity data 204 may include transaction data that verifies the activity occurred. For example, the activity data 204 may include a purchase for dinner at a particular restaurant. Activity verification system 102 may verify that the user visited that particular restaurant using activity data 204. As described herein, activity verification system 102 may receive data structure 200 of activity data from a user device via communication subsystem 112.

Communication subsystem 112 may include software components, hardware components, or a combination of both. For example, communication subsystem 112 may include a network card (e.g., a wireless network card and/or a wired network card) that is associated with software to drive the card. In some embodiments, communication subsystem 112 may receive one or more requests to share validated user activity and/or one or more requests for accessing activity data from one of cryptography-based storage applications 108a-108n. For example, a user associated with cryptography-based storage application 108a may have activity data they wish to share to a social media platform 110. In order to do so, the first user may request to post the user's activity data (e.g., activity data, purchases, etc.) to a social media platform 110.

Activity verification system 102 may determine a user device hosting a cryptography-based storage application that controls the non-fungible token via the data processing subsystem 116. In particular, data processing subsystem 116 may determine, based on the token identifier, a user device hosting a cryptography-based storage application that controls the cryptographic token. For example, when activity verification system 102 receives a request to post an activity, activity verification system 102 may need to identify a user device that stores a cryptography-based storage application of the user.

Activity verification system 102 may transmit to the identified user device a request to generate a cryptographic signature via communication subsystem 112. In particular, communication subsystem 112 may transmit to a user device hosting a cryptography-based storage application, a request to generate a cryptographic signature using a private key associated with the cryptography-based storage application (e.g., cryptography-based storage application 108a). For example, the user may receive the request to generate a cryptographic signature before the activity verification system may post the non-fungible token.

Activity verification system 102 may receive the cryptographic signature via the communication subsystem 112. After receiving the cryptographic signature, activity verification 102 may transmit a post request to the social media platform 110. In particular, activity verification 102 may transmit a post request to the social media platform. The post request may include the cryptographic signature and the token identifier of the non-fungible token. For example, the post may be a picture of a handbag the user purchased together with the data to validate the purchase (e.g., an identifier of the non-fungible token and a cryptographic signature).

Social media platform 110 may include software components, hardware components, or a combination of both. For example, social media platform 110 may include software components (e.g., code) that receives the request to post the share validated user activity. Social media platform 110 may include hardware components (e.g., a laptop computer, a smartphone, a desktop computer, an electronic tablet, or another suitable user device) that display the content of the social media platform. As referred to herein, "content" should be understood to mean an electronically consumable user asset, such as Internet content (e.g., streaming content, downloadable content, Webcasts, etc.), video clips, audio, content information, pictures, rotating images, documents, playlists, websites, articles, books, electronic books, blogs, advertisements, chat sessions, social media content, applications, games, and/or any other media or multimedia and/or combination of the same. Content may be recorded, played, displayed, or accessed by user devices, but can also be part of a live performance.

For example, when a user first requests to share validated user activity data (e.g., purchases), the activity verification system 102 may receive a registration request using communication subsystem 112. The registration request may include an identifier associated with the cryptography-based storage application of the user. Communication subsystem 112 may pass at least a portion of the data included in the registration request, or a pointer to the data in memory, to data processing subsystem 116. Components of the registration request to register a user account are described further herein with reference to FIG. 3.

FIG. 3 illustrates an exemplary data structure 300 representing a registration request. Data structure 300 may include user identifier 302, cryptography-based storage application identifier 304, and device identifier 306. Data processing subsystem 116 may receive a registration request to register a user account. In particular, data processing subsystem 116 may receive, from the user device (e.g., a smartphone), a registration request to register a user account for storing token identifiers of non-fungible tokens associated with the user. The registration request may include an identifier associated with the cryptography-based storage application (e.g., cryptography-based storage application identifier 304). Data processing subsystem 116 may generate a user identifier (e.g., user identifier 302) for the user account. Data processing subsystem 116 may store a data structure 300 of a user account. For example, data processing subsystem 116 may store, within the user account, the user identifier (e.g., user identifier 302), device information corresponding to the user device (e.g., device identifier 306), and the identifier associated with the cryptography-based storage application (e.g., cryptography-based storage application identifier 304). By registering the user for a user account, the system is easily able to store and find non-fungible tokens associated with the user to post when receiving a post request.

In some embodiments, the activity verification system 102 may receive a generation request to generate a non-fungible token based on the activity data of the user via the communication subsystem 112. Communication subsystem 112 may pass at least a portion of the data included in the generation request, or a pointer to the data in memory, to token processing subsystem 114. For example, a user may want to post an image of an exclusive bag that the user purchased to inform other users of the purchase. The user may, when purchasing the bag, receive control of a non-fungible token that the merchant mints to the user to prove that the purchase is authentic. Thus, activity verification system may transmit a generation request to generate the non-fungible token for the user.

Token processing subsystem 114 may include software components, hardware components, or a combination of both. For example, token processing subsystem 114 may include software components that access and/or execute programs such as on-chain programs to generate tokens (e.g., cryptographic tokens).

Figure 4:
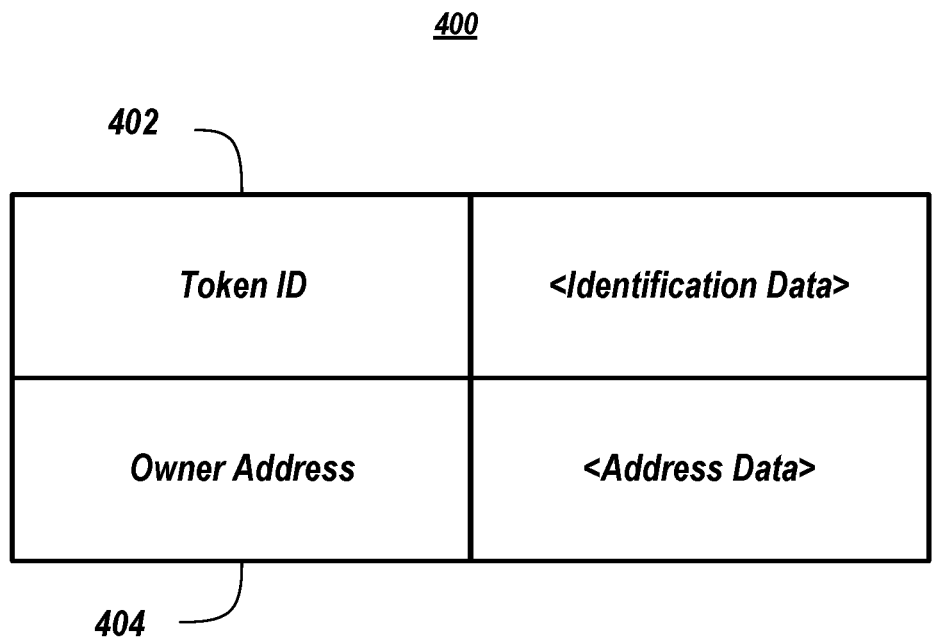
FIG. 4 illustrates a data structure representing a cryptographic token, in accordance with one or more embodiments of this disclosure.

Components of the generation request to generate the non-fungible token are described further herein with reference to FIG. 4. FIG. 4 illustrates a data structure 400 representing a cryptographic token generated by token processing subsystem 114. Data structure 400 may include token identifier 402 and owner address 404. Token identifier 402 may be an identifier for the cryptographic token. Token identifier 402 may have a value such as an unsigned integer value from 8 bits to 256 bits. In some embodiments, the term owner address refers to an address (e.g., an identifier) associated with a cryptography-based storage application that is able to transfer the cryptographic token to be controlled by another cryptography-based storage application by signing a blockchain operation (e.g., a blockchain transaction) with a private key associated with the cryptography-based storage application. Owner address 404 may have a value identifying the owner of the token. As described herein, token processing subsystem 114 may insert the owner address into the cryptographic token such that owner address 404 of the generated cryptographic token contains the address to the user's (e.g., the owner of the non-fungible token) cryptography-based storage application. The owner address may be a string of alphanumeric characters, a wallet address, etc.

Token processing subsystem 114 may determine, based on a user identifier associated with the user, an identifier associated with the cryptography-based storage application corresponding to the user. Token processing subsystem 114 may receive the data from data processing subsystem 116. For example, token processing subsystem 114 may determine, based on a user identifier associated with the user (e.g., user identifier 302), an identifier associated with the cryptography-based storage application (e.g., cryptography-based storage application identifier 304) corresponding to the user. For example, when the user receives control of the non-fungible token, the activity verification system may determine the cryptography-based storage application associated with the user.

Token processing subsystem 114 may generate, using an on-chain program, the non-fungible token assigned to the identifier associated with the cryptography-based storage application (e.g., cryptography-based storage application identifier 402). The non-fungible token may include a portion of the activity data. For example, the non-fungible token may include activity data 204.

Figure 5:
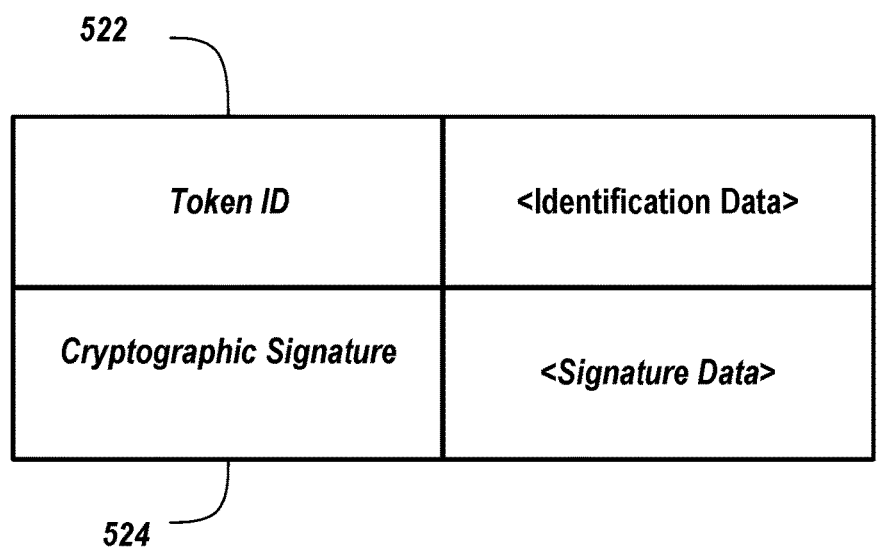
FIG. 5 illustrates data structures representing a user account and a posting request, in accordance with one or more embodiments of this disclosure.

FIG. 5 illustrates a data structure 500 representing a user account. Data structure 500 may include user identifier 502, cryptography-based storage application identifier 504, and token identifier 506. In some embodiments, activity verification system 102 may transmit the token identifier associated with the cryptographic token to the user device with a storage request to store the non-fungible token with other token identifiers associated with other non-fungible tokens corresponding to other user activity. The user device (e.g., a smartphone) may generate a token selection interface that enables the user to select the non-fungible token from a list of token identifiers. Data processing subsystem 116 may receive selected token identifier from the user device (e.g., a smartphone). For example, after the user requests the merchant to mint the non-fungible token, the activity verification system may ensure it is stored with previous non-fungible tokens that were generated. Then, the user may select which non-fungible token they wish to share.

In some embodiments, data processing subsystem 116 may search for the user device hosting a cryptography-based storage application. In particular, data processing subsystem 116 may search registration data for all devices registered with the system. Data processing subsystem 116 may search the registration data for the user account using an identifier of the cryptographic token. For example, data processing subsystem 116 may use the identifier of the token to retrieve an identifier of the cryptography-based storage application that controls the cryptographic token. Based on the identifier of the cryptography-based storage application, data processing subsystem 116 may perform a lookup with the registration data (as shown in FIG. 3) and identify the client device associated cryptography-based storage application. Thus, data processing subsystem 116 may determine based on the token identifier (e.g., token identifier 402), a user device hosting a cryptography-based storage application that controls the cryptographic token (e.g., device identifier 306). For example, the system may determine a user device that hosts the non-fungible token to generate a cryptographic signature for the non-fungible token before posting the token identifier and cryptographic signature and metadata to social media.

In some embodiments, data processing subsystem 116 may compare the token identifier (e.g., token identifier 402) with a plurality of token identifiers within a database of token identifiers. The database may store the token identifiers (e.g., token identifier 402) and the corresponding user accounts (e.g., as shown in data structure 300). Data processing subsystem 116 may identify a user account (e.g., data structure 300) based on the token identifier (e.g., token identifier 402) matching a stored token identifier within the database. Data processing subsystem 116 may retrieve, from the user account (e.g., as shown in data structure 300), an identifier of the user device (e.g., device identifier 306). As discussed above, data processing subsystem 116 may retrieve the identifier of the user device from the registration data.

When the user device hosting the cryptography-based storage application is identified, communication subsystem 112 may transmit to that device a request to generate a cryptographic signature. In particular, communication subsystem 112 may transmit to a user device hosting a cryptography-based storage application, a request to generate a cryptographic signature using a private key associated with the cryptography-based storage application (e.g., cryptography-based storage application 108a). For example, the user device hosting the cryptography-based storage application may generate a cryptographic signature that may be posted to the social media platform 110. Components of transmitting a request to generate a cryptographic signature are described further herein with reference to FIG. 5.

FIG. 5 illustrates a data structure 520 representing a posting request. Data structure 520 may include token identifier 522 and cryptographic signature 524. In some embodiments, communication subsystem 112 may transmit, to the user device, a command to encrypt a portion of the activity data (e.g., data structure 200) using the private key into encrypted activity data. Token processing subsystem 114 may store the encrypted activity data as the cryptographic signature (e.g., cryptographic signature 524). Communication subsystem 112 may receive the cryptographic signature (e.g., cryptographic signature 524). In some embodiments, the cryptographic signature may include a nonce encrypted using a private key of the cryptography-based storage application.

Activity verification system 102 may transmit a post request to the social media platform 110. For example, the communication subsystem 112 may transmit the post request to the social media platform 110. The post request may include the cryptographic signature (e.g., cryptographic signature 524) and the token identifier of the cryptographic token (e.g., token identifier 522). For example, the post may be a picture of a handbag the user purchased together with the data to validate the purchase (e.g., an identifier of the NFT and a cryptographic signature).

When the activity is posted a particular user that sees the activity may want to validity the posted activity. Thus, in some embodiments, the activity verification system 102 may receive a validation request from another user. In particular, communication subsystem 112 may receive from a device associated with the social media platform (e.g., a smartphone), a validation request. The validation request may include the cryptographic signature and the identifier of the non-fungible token. For example, the other user may select a validation option on the social media platform. The data processing subsystem 116 may determine, based on the identifier of the non-fungible token, the identifier associated with the cryptography-based storage application (e.g., the cryptography-based storage application that controls the cryptographic token). The token processing subsystem 114 may validate the cryptographic signature using the identifier associated with the cryptography-based storage application. For example, token processing subsystem 114 may decrypt the cryptographic signature using a public key associated with the cryptography-based storage application that controls the cryptographic token as retrieved from the data associated with the cryptographic token. If the decrypted data matches the unencrypted data, token processing subsystem 114 may determine that the activity is valid. For example, a second user that follows the user on social media may request to validate the non-fungible token belongs to the user by validating the cryptographic signature using the identifier associated with the cryptography-based storage application.

In some embodiments, activity verification 102 may receive a validation request that may include the encrypted activity data. In particular, the communication subsystem 112 may receive from a device associated with the social media platform 110 a validation request. The validation request may include the encrypted activity data and the token identifier associated with the non-fungible token. The data processing subsystem 116 may determine, based on the token identifier, an identifier associated with the cryptography-based storage application. The token processing subsystem 114 may validate the activity data using the identifier associated with the cryptography-based storage application. As mentioned before, token processing subsystem 114 may decrypt the cryptographic signature using a public key associated with the cryptography-based storage application that controls the cryptographic token as retrieved from the data associated with the cryptographic token. If the decrypted data matches the unencrypted data, token processing subsystem 114 may determine that the activity is valid.

Computing Environment

Figure 6:
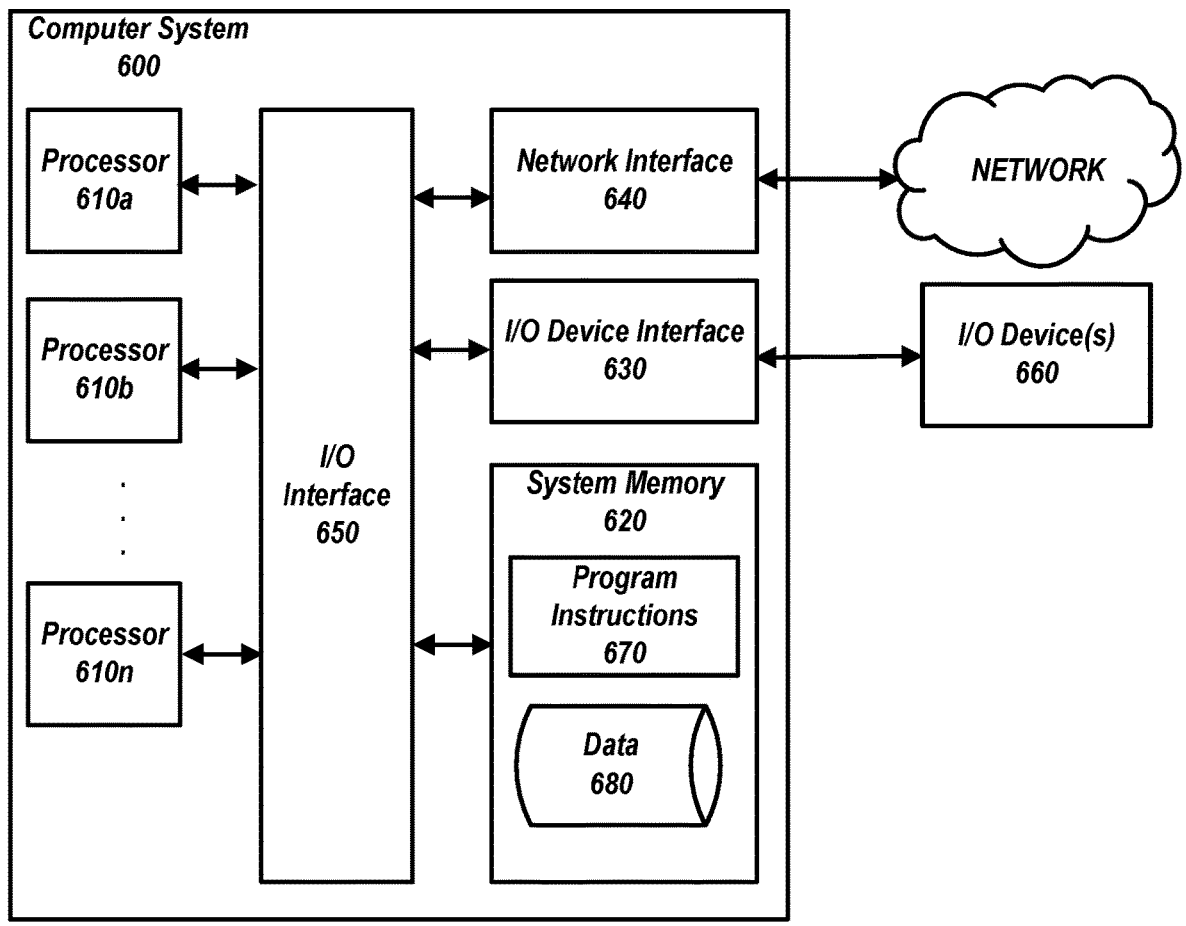
FIG. 6 illustrates a computing device, in accordance with one or more embodiments of this disclosure.

FIG. 6 shows an example computing system that may be used in accordance with some embodiments of this disclosure. In some instances, computing system 600 is referred to as a computer system 600. A person skilled in the art would understand that those terms may be used interchangeably. The components of FIG. 6 may be used to perform some or all operations discussed in relation to FIGS. 1-5. Furthermore, various portions of the systems and methods described herein may include or be executed on one or more computer systems similar to computing system 600. Further, processes and modules described herein may be executed by one or more processing systems similar to that of computing system 600.

Computing system 600 may include one or more processors (e.g., processors 610a-610n) coupled to system memory 620, an input/output (I/O) device interface 630, and a network interface 640 via an I/O interface 650. A processor may include a single processor, or a plurality of processors (e.g., distributed processors). A processor may be any suitable processor capable of executing or otherwise performing instructions. A processor may include a central processing unit (CPU) that carries out program instructions to perform the arithmetical, logical, and input/output operations of computing system 600. A processor may execute code (e.g., processor firmware, a protocol stack, a database management system, an operating system, or a combination thereof) that creates an execution environment for program instructions. A processor may include a programmable processor. A processor may include general or special purpose microprocessors. A processor may receive instructions and data from a memory (e.g., system memory 620). Computing system 600 may be a uni-processor system including one processor (e.g., processor 610a), or a multi-processor system including any number of suitable processors (e.g., 610a-610n). Multiple processors may be employed to provide for parallel or sequential execution of one or more portions of the techniques described herein. Processes, such as logic flows, described herein may be performed by one or more programmable processors executing one or more computer programs to perform functions by operating on input data and generating corresponding output. Processes described herein may be performed by, and apparatus can also be implemented as, special purpose logic circuitry, e.g., an FPGA (field-programmable gate array) or an ASIC (application-specific integrated circuit). Computing system 600 may include a plurality of computing devices (e.g., distributed computer systems) to implement various processing functions.

I/O device interface 630 may provide an interface for connection of one or more I/O devices 660 to computer system 600. I/O devices may include devices that receive input (e.g., from a user) or output information (e.g., to a user). I/O devices 660 may include, for example, a graphical user interface presented on displays (e.g., a cathode ray tube (CRT) or liquid crystal display (LCD) monitor), pointing devices (e.g., a computer mouse or trackball), keyboards, keypads, touchpads, scanning devices, voice recognition devices, gesture recognition devices, printers, audio speakers, microphones, cameras, or the like. I/O devices 660 may be connected to computer system 600 through a wired or wireless connection. I/O devices 660 may be connected to computer system 600 from a remote location. I/O devices 660 located on remote computer systems, for example, may be connected to computer system 600 via a network and network interface 640.

Network interface 640 may include a network adapter that provides for connection of computer system 600 to a network. Network interface 640 may facilitate data exchange between computer system 600 and other devices connected to the network. Network interface 640 may support wired or wireless communication. The network may include an electronic communication network, such as the Internet, a local area network (LAN), a wide area network (WAN), a cellular communications network, or the like.

System memory 620 may be configured to store program instructions 670 or data 680. Program instructions 670 may be executable by a processor (e.g., one or more of processors 610a-610n) to implement one or more embodiments of the present techniques. Program instructions 670 may include modules of computer program instructions for implementing one or more techniques described herein with regard to various processing modules. Program instructions may include a computer program (which in certain forms is known as a program, software, software application, script, or code). A computer program may be written in a programming language, including compiled or interpreted languages, or declarative or procedural languages. A computer program may include a unit suitable for use in a computing environment, including as a stand-alone program, a module, a component, or a subroutine. A computer program may or may not correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, subprograms, or portions of code). A computer program may be deployed to be executed on one or more computer processors located locally at one site, or distributed across multiple remote sites and interconnected by a communication network.

System memory 620 may include a tangible program carrier having program instructions stored thereon. A tangible program carrier may include a non-transitory computer-readable storage medium. A non-transitory computer-readable storage medium may include a machine-readable storage device, a machine-readable storage substrate, a memory device, or any combination thereof. A non-transitory computer-readable storage medium may include non-volatile memory (e.g., flash memory, ROM, PROM, EPROM, EEPROM memory), volatile memory (e.g., random access memory (RAM), static random-access memory (SRAM), synchronous dynamic RAM (SDRAM)), bulk storage memory (e.g., CD-ROM and/or DVD-ROM, hard drives), or the like. System memory 620 may include a non-transitory computer-readable storage medium that may have program instructions stored thereon that are executable by a computer processor (e.g., one or more of processors 610a-610n) to cause the subject matter and the functional operations described herein. A memory (e.g., system memory 620) may include a single memory device and/or a plurality of memory devices (e.g., distributed memory devices).

I/O interface 650 may be configured to coordinate I/O traffic between processors 610a-610n, system memory 620, network interface 640, I/O devices 660, and/or other peripheral devices. I/O interface 650 may perform protocol, timing, or other data transformations to convert data signals from one component (e.g., system memory 620) into a format suitable for use by another component (e.g., processors 610a-610n). I/O interface 650 may include support for devices attached through various types of peripheral buses, such as a variant of the Peripheral Component Interconnect (PCI) bus standard or the Universal Serial Bus (USB) standard.

Embodiments of the techniques described herein may be implemented using a single instance of computer system 600, or multiple computer systems 600 configured to host different portions or instances of embodiments. Multiple computer systems 600 may provide for parallel or sequential processing/execution of one or more portions of the techniques described herein.

Those skilled in the art will appreciate that computer system 600 is merely illustrative, and is not intended to limit the scope of the techniques described herein. Computer system 600 may include any combination of devices or software that may perform or otherwise provide for the performance of the techniques described herein. For example, computer system 600 may include or be a combination of a cloud-computing system, a data center, a server rack, a server, a virtual server, a desktop computer, a laptop computer, a tablet computer, a server device, a client device, a mobile telephone, a personal digital assistant (PDA), a mobile audio or video player, a game console, a vehicle-mounted computer, a Global Positioning System (GPS), or the like. Computer system 600 may also be connected to other devices that are not illustrated, or may operate as a stand-alone system. In addition, the functionality provided by the illustrated components may, in some embodiments, be combined in fewer components, or distributed in additional components. Similarly, in some embodiments, the functionality of some of the illustrated components may not be provided, or other additional functionality may be available.

Operation Flow

Figure 7:
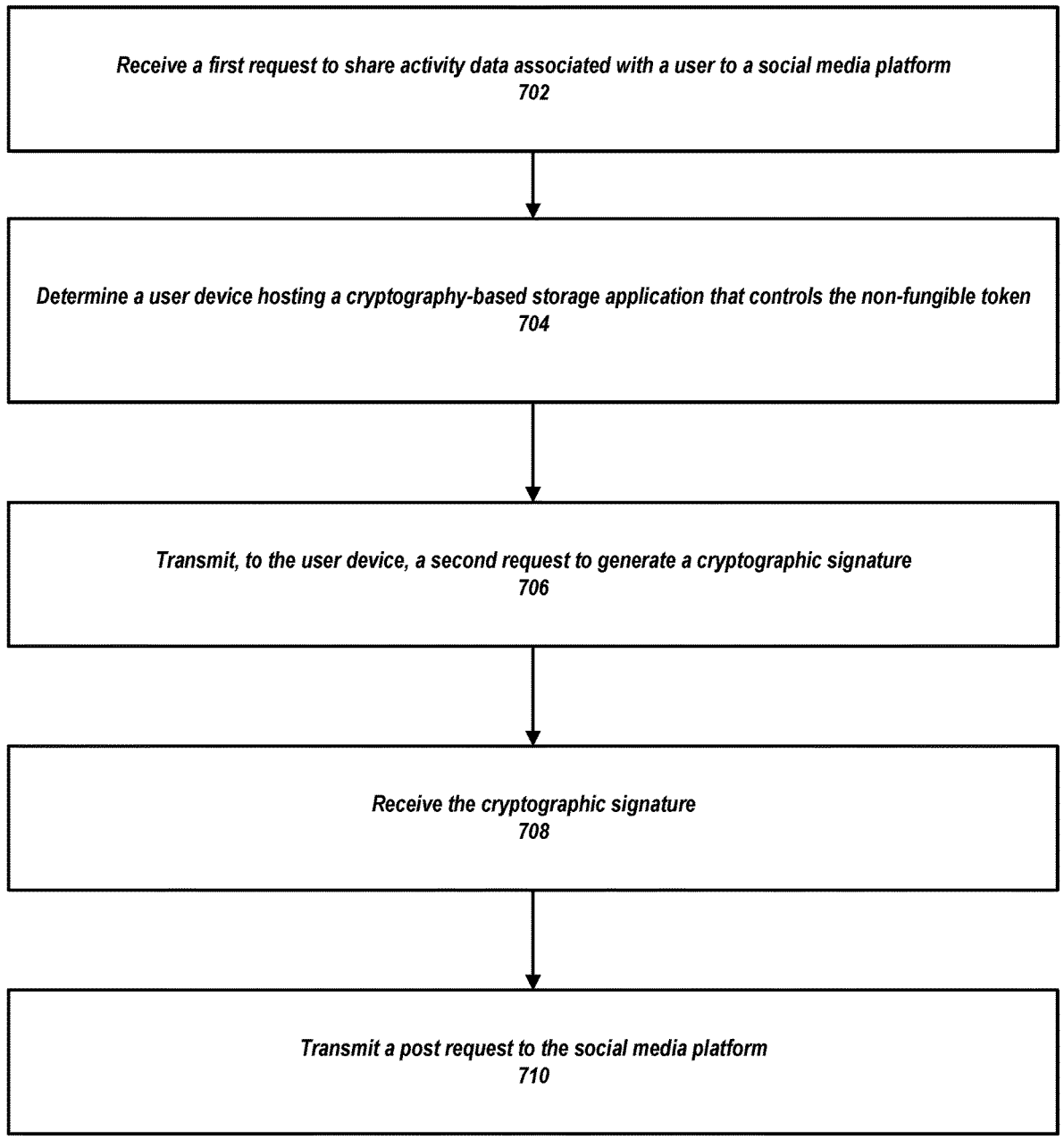
FIG. 7 shows a flowchart of the steps involved in sharing validated user activity, in accordance with one or more embodiments.

FIG. 7 is a flowchart 700 of operations for sharing validated user activity, in accordance with one or more embodiments. The operations of FIG. 7 may use components described in relation to FIG. 6. In some embodiments, activity verification system 102 may include one or more components of computer system 600.

At 702, activity verification system 102 (e.g., using one or more components described above) receives a first request to share activity data associated with a user to a social media platform. For example, activity verification system 102 may receive a first request to share activity data associated with a user to a social media platform. The first request may include a token identifier associated with a non-fungible token. The non-fungible token was generated based on the activity data associated with the user. Activity verification system 102 may use I/O device interface 630, I/O device 660, and network interface 640.

At 704, activity verification system 102 (e.g., using one or more components described above) determines a user device hosting a cryptography-based storage application that controls the non-fungible token. For example, activity verification system 102 may determine, based on the token identifier, a user device hosting a cryptography-based storage application that controls the non-fungible token. Activity verification system 102 may use I/O device interface 630, I/O device 660, and network interface 640.

At 706, activity verification system 102 (e.g., using one or more components described above) transmits, to the user device, a second request to generate a cryptographic signature. For example, activity verification system 102 may transmit to the user device hosting the cryptography-based storage application, a second request to generate a cryptographic signature using a private key associated with the cryptography-based storage application. Activity verification system 102 may use I/O device interface 630, I/O device 660, network interface 640, and processors 610a, 610b, and/or 610n.

At 708, activity verification system 102 (e.g., using one or more components described above) receives the cryptographic signature. For example, activity verification system 102 may in response to the second request, receive the cryptographic signature. Activity verification system 102 may use I/O device interface 630, I/O device 660, and network interface 640.

At 710, activity verification system 102 (e.g., using one or more components described above) transmits a post request to the social media platform. For example, activity verification system 102 may transmit a post request to the social media platform. The post request may include the cryptographic signature and the token identifier of the non-fungible token. Activity verification system 102 may use I/O device interface 630, I/O device 660, network interface 640, and processors 610a, 610b, and/or 610n.

It is contemplated that the steps or descriptions of FIG. 7 may be used with any other embodiment of this disclosure. In addition, the steps and descriptions described in relation to FIG. 7 may be done in alternative orders or in parallel to further the purposes of this disclosure. For example, each of these steps may be performed in any order, in parallel, or simultaneously to reduce lag or increase the speed of the system or method. Furthermore, it should be noted that any of the components, devices, or equipment discussed in relation to the figures above could be used to perform one or more of the steps in FIG. 7.

The above-described embodiments of the present disclosure are presented for purposes of illustration and not of limitation, and the present disclosure is limited only by the claims which follow. Furthermore, it should be noted that the features and limitations described in any one embodiment may be applied to any embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

The present techniques will be better understood with reference to the following enumerated embodiments:

1. A method for sharing validated user activity, the method comprising: receiving a first request to share activity data associated with a user to a social media platform, wherein the first request comprises a token identifier associated with a non-fungible token, and wherein the non-fungible token was generated based on the activity data associated with the user; determining, based on the token identifier, a user device hosting a cryptography-based storage application that controls the non-fungible token; transmitting, to the user device hosting the cryptography-based storage application, a second request to generate a cryptographic signature using a private key associated with the cryptography-based storage application; in response to the second request, receiving the cryptographic signature; and transmitting a post request to the social media platform, wherein the post request comprises the cryptographic signature and the token identifier of the non-fungible token.

2. The method of any one of the preceding embodiments, further comprising: prior to receiving the first request, receiving, from the user device, a registration request to register a user account for storing token identifiers of non-fungible tokens associated with the user, wherein the registration request comprises an identifier associated with the cryptography-based storage application; in response to the registration request generating a user identifier for the user account; and storing, within the user account, the user identifier, device information corresponding to the user device and the identifier associated with the cryptography-based storage application.

3. The method of any one of the preceding embodiments, further comprising: receiving, from a device associated with the social media platform, a validation request, wherein the validation request comprises the cryptographic signature and the identifier of the non-fungible token; determining, based on the identifier of the non-fungible token, the identifier associated with the cryptography-based storage application; and validating the cryptographic signature using the identifier associated with the cryptography-based storage application.

4. The method of any one of the preceding embodiments, wherein determining, based on the token identifier, the user device hosting the cryptography-based storage application that controls the non-fungible token comprises: comparing the token identifier with a plurality of token identifier with a database of token identifiers, wherein the database stores the token identifiers and corresponding user accounts; identifying a user account based on the token identifier matching a stored token identifier within the database; and retrieving, from the user account, an identifier of the user device.

5. The method of any one of the preceding embodiments, further comprising: receiving, from a computing device, a generation request to generate the non-fungible token based on the activity data of the user; determining, based on a user identifier associated with the user, an identifier associated with the cryptography-based storage application corresponding to the user; and generating, using an on-chain program, the non-fungible token assigned to the identifier associated with the cryptography-based storage application, wherein the non-fungible token comprises a portion of the activity data.

6. The method of any one of the preceding embodiments, further comprising: transmitting the token identifier associated with the non-fungible token to the user device with a storage request to store the non-fungible token with other token identifiers associated with other non-fungible tokens corresponding to other user activity; causing the user device to generate a token selection interface that enables the user to select the non-fungible token from a list of token identifiers; and receiving selected token identifier from the user device.

7. The method of any one of the preceding embodiments, wherein transmitting, to the user device hosting the cryptography-based storage application, the second request to generate the cryptographic signature using the private key associated with the cryptography-based storage application further comprises: transmitting, to the user device, a command to encrypt at least a portion of the activity data using the private key into encrypted activity data; and storing the encrypted activity data as the cryptographic signature.

8. The method of any one of the preceding embodiments, further comprising: receiving, from a device associated with the social media platform, a validation request, wherein the validation request comprises the encrypted activity data and the token identifier associated with the non-fungible token; determining, based on the token identifier, an identifier associated with the cryptography-based storage application; and validating the activity data using the identifier associated with the cryptography-based storage application.

9. A tangible, non-transitory, machine-readable medium storing instructions that, when executed by a data processing apparatus, cause the data processing apparatus to perform operations comprising those of any of embodiments 1-8.

10. A system comprising one or more processors; and memory storing instructions that, when executed by the processors, cause the processors to effectuate operations comprising those of any of embodiments 1-8.

11. A system comprising means for performing any of embodiments 1-8.

What is claimed is:

1. A system for sharing validated user activity, the system comprising:
   one or more processors; and
   a non-transitory computer-readable storage medium storing instructions, which when executed by the one or more processors cause the one or more processors to perform operations comprising:
      receiving, from a computing device, a generation request to generate a non-fungible token based on activity of a user, wherein the generation request comprises activity data associated with the user, the activity data including a user identifier;
      determining, based on the user identifier, an address associated with a cryptography-based storage application corresponding to the user, wherein the cryptography-based storage application comprises a private key;
      generating, by a merchant and using an on-chain program, the non-fungible token assigned to the address associated with the cryptography-based storage application, wherein the non-fungible token comprises the activity data;
      receiving a posting request to post the activity data to a social media platform, wherein the posting request comprises a token identifier associated with the non-fungible token, wherein th token identifier is selectable, via a token selection interface, by the user from a list of token identifiers; and
      based on receiving the posting request:
         transmitting to a user device hosting the cryptography-based storage application, a signature request to generate a cryptographic signature using the private key, wherein the signature request comprises an identifier associated with the cryptography-based storage application;
         in response to the signature request, receiving the cryptographic signature; and
         transmitting the posting request to a device associated with the social media platform, wherein the posting request comprises the cryptographic signature, the identifier of the non-fungible token.

2. The system of claim 1, wherein the instructions cause the one or more processors to perform operations comprising:
   prior to receiving the generation request, receiving, from the user device, a registration request to register a user account for storing token identifiers of non-fungible tokens associated with the user, wherein the registration request comprises the address associated with the cryptography-based storage application;
   in response to the registration request generating the user identifier for the user account; and
   storing, within the user account, the user identifier, device information corresponding to the user device and the address associated with the cryptography-based storage application.

3. The system of claim 2, wherein the instructions cause the one or more processors to perform operations comprising:
   receiving, from the device associated with the social media platform, a validation request, wherein the validation request comprises the cryptographic signature, the identifier of the non-fungible token;
   determining, based on the identifier of the non-fungible token, the address of the cryptography-based storage application; and
   validating the cryptographic signature using the address associated with the cryptography-based storage application.

4. The system of claim 1, wherein the instructions cause the one or more processors to perform operations comprising:
   transmitting the token identifier associated with the non-fungible token to the user device with a storage request to store the non-fungible token with other token identifiers associated with other non-fungible tokens corresponding to other user activity;
   receiving selected of the token identifier from the user device.

5. A method for sharing validated user activity, the method comprising:
   receiving a first request to share activity data associated with a user to a social media platform, wherein the first request comprises a token identifier associated with a non-fungible token, and wherein the non-fungible token was generated , by a merchant, based on the activity data associated with the user;
   determining, based on the token identifier, a user device hosting a cryptography-based storage application that controls the non-fungible token, by a merchant, based on the activity data associated with the user ;
   transmitting, to the user device hosting the cryptography-based storage application, a second request to generate a cryptographic signature using a private key associated with the cryptography-based storage application;
   in response to the second request, receiving the cryptographic signature; and
   transmitting a post request to the social media platform, wherein the post request comprises the cryptographic signature and the token identifier of the non-fungible token.

6. The method of claim 5, further comprising:
   prior to receiving the first request, receiving, from the user device, a registration request to register a user account for storing token identifiers of non-fungible tokens associated with the user, wherein the registration request comprises an identifier associated with the cryptography-based storage application;

in response to the registration request generating a user identifier for the user account; and storing, within the user account, the user identifier, device information corresponding to the user device and the identifier associated with the cryptography-based storage application.

7. The method of claim 6, further comprising:

receiving, from a device associated with the social media platform, a validation request, wherein the validation request comprises the cryptographic signature and the identifier of the non-fungible token;

determining, based on the identifier of the non-fungible token, the identifier associated with the cryptography-based storage application; and validating the cryptographic signature using the identifier associated with the cryptography-based storage application.

8. The method of claim 5, wherein determining, based on the token identifier, the user device hosting the cryptography-based storage application that controls the non-fungible token comprises:

comparing the token identifier with a plurality of token identifier with a database of token identifiers, wherein the database stores the token identifiers and corresponding user accounts;

identifying a user account based on the token identifier matching a stored token identifier within the database; and retrieving, from the user account, an identifier of the user device.

9. The method of claim 5, further comprising:

receiving, from a computing device, a generation request to generate the non-fungible token based on the activity data of the user;

determining, based on a user identifier associated with the user, an identifier associated with the cryptography-based storage application corresponding to the user; and generating, using an on-chain program, the non-fungible token assigned to the identifier associated with the cryptography-based storage application, wherein the non-fungible token comprises a portion of the activity data.

10. The method of claim 5, further comprising:

transmitting the token identifier associated with the non-fungible token to the user device with a storage request to store the non-fungible token with other token identifiers associated with other non-fungible tokens corresponding to other user activity;

receiving a selection of the token identifier from the user device.

11. The method of claim 5, wherein transmitting, to the user device hosting the cryptography-based storage application, the second request to generate the cryptographic signature using the private key associated with the cryptography-based storage application further comprises:

transmitting, to the user device, a command to encrypt at least a portion of the activity data using the private key into encrypted activity data; and storing the encrypted activity data as the cryptographic signature.

12. The method of claim 11, further comprising:

receiving, from a device associated with the social media platform, a validation request, wherein the validation request comprises the encrypted activity data and the token identifier associated with the non-fungible token;

determining, based on the token identifier, an identifier associated with the cryptography-based storage application; and validating the activity data using the identifier associated with the cryptography-based storage application.

13. A non-transitory, computer-readable storage medium storing instructions that when executed by one or more processors cause the one or more processors to perform operations comprising:

receiving a first request to share activity data associated with a user to a social media platform, wherein the first request comprises a token identifier associated with a non-fungible token, and wherein the non-fungible token was generated, by a merchant, based on the activity data associated with the user;

determining, based on the token identifier, a user device hosting a cryptography-based storage application that controls the non-fungible token, wherein the token identifier is selectable, via a token selection interface, by the user from a list of token identifiers;

transmitting, to the user device hosting the cryptography-based storage application, a second request to generate a cryptographic signature using a private key associated with the cryptography-based storage application;

in response to the second request, receiving the cryptographic signature; and transmitting a post request to the social media platform, wherein the post request comprises the cryptographic signature and the token identifier of the non-fungible token.

14. The non-transitory, computer-readable storage medium of claim 13, wherein the instructions further cause the one or more processors to perform operations comprising:

prior to receiving the first request, receiving, from the user device, a registration request to register a user account for storing token identifiers of non-fungible tokens associated with the user, wherein the registration request comprises an identifier associated with the cryptography-based storage application;

in response to the registration request generating a user identifier for the user account; and storing, within the user account, the user identifier, device information corresponding to the user device and the identifier associated with the cryptography-based storage application.

15. The non-transitory, computer-readable storage medium of claim 13, wherein the instructions further cause the one or more processors to perform operations comprising:

receiving, from a device associated with the social media platform, a validation request, wherein the validation request comprises the cryptographic signature and the token identifier of the non-fungible token;

determining, based on the token identifier of the non-fungible token, an identifier associated with the cryptography-based storage application; and validating the cryptographic signature using the identifier associated with the cryptography-based storage application.

16. The non-transitory, computer-readable storage medium of claim 13, wherein the instructions for determining, based on the token identifier, the user device hosting the cryptography-based storage application that controls the non-fungible token cause the one or more processors to perform operations comprising:

comparing the token identifier with a plurality of token identifier with a database of token identifiers, wherein the database stores the token identifiers and corresponding user accounts;

identifying a user account based on the token identifier matching a stored token identifier within the database; and retrieving, from the user account, an identifier of the user device.

17. The non-transitory, computer-readable storage medium of claim 13, wherein the instructions further cause the one or more processors to perform operations comprising:

receiving, from a computing device, a generation request to generate the non-fungible token based on the activity data of the user;

determining, based on a user identifier associated with the user, an identifier associated with the cryptography-based storage application corresponding to the user; and generating, using an on-chain program, the non-fungible token assigned to the identifier associated with the cryptography-based storage application, wherein the non-fungible token comprises a portion of the activity data.

18. The non-transitory, computer-readable storage medium of claim 13, wherein the instructions further cause the one or more processors to perform operations comprising:

transmitting the token identifier associated with the non-fungible token to the user device with a storage request to store the non-fungible token with other token identifiers associated with other non-fungible tokens corresponding to other user activity;

receiving a selection of the token identifier from the user device.

19. The non-transitory, computer-readable storage medium of claim 13, wherein the instructions for transmitting, to the user device hosting the cryptography-based storage application, the second request to generate the cryptographic signature using the private key associated with the cryptography-based storage application cause the one or more processors to perform operations comprising:

transmitting, to the user device, a command to encrypt at least a portion of the activity data using the private key into encrypted activity data; and storing the encrypted activity data as the cryptographic signature.

20. The non-transitory, computer-readable storage medium of claim 19, wherein the instructions further cause the one or more processors to perform operations comprising:

receiving, from a device associated with the social media platform, a validation request, wherein the validation request comprises the encrypted activity data and the token identifier associated with the non-fungible token;

determining, based on the token identifier, an identifier associated with the cryptography-based storage application; and validating the activity data using the identifier associated with the cryptography-based storage application.

* * * * *